United States Patent [19]

Giles, Jr. et al.

[11] 4,395,518
[45] Jul. 26, 1983

[54] POLYETHERIMIDE-ACRYLATE COPOLYMER BLENDS

[75] Inventors: Harold F. Giles, Jr., Cheshire, Mass.; Dwain M. White, Schenectady, N.Y.

[73] Assignee: General Electric Company, Pittsfield, Mass.

[21] Appl. No.: 359,509

[22] Filed: Mar. 18, 1982

[51] Int. Cl.³ .............................................. C08L 79/08
[52] U.S. Cl. .................................... 525/180; 525/183
[58] Field of Search ................................ 525/180, 183

[56] References Cited

U.S. PATENT DOCUMENTS 4,255,471  5/1981  Boldebuck ........................... 525/183

Primary Examiner—Paul Lieberman
Attorney, Agent, or Firm—Bernard, Rothwell & Brown

[57] ABSTRACT

Disclosed are blends of (a) a polyetherimide and (b) a minor amount of an acrylate copolymer of $C_1$–$C_5$ acrylate and $C_1$–$C_5$ methacrylate. These blends have a higher impact strength than that associated with the polyetherimide component of the blends. In addition, the blends exhibit improved extrusion and molding performance characteristics over those of the polyetherimide component of the blend when molded alone.

9 Claims, No Drawings

POLYETHERIMIDE-ACRYLATE COPOLYMER BLENDS

This invention relates to a class of polyetherimide-acrylate copolymer blends. These blends have a higher impact strength than that associated with the polyetherimide component of the blends. In addition, the blends exhibit improved extrusion and molding performance characteristics over those of the polyetherimide component of the blend when molded alone.

The blends of the invention include a polyetherimide of the formula:

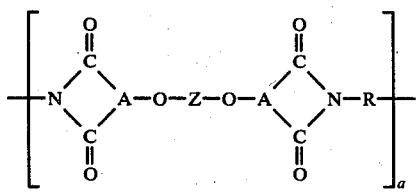

where a represents a whole number in excess of 1, e.g., 10 to 10,000 or more, the group —O—A< is selected from:

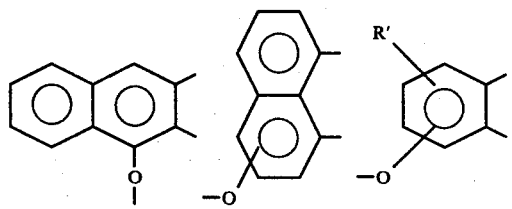

R' being hydrogen, lower alkyl or lower alkoxy, preferably the polyetherimide includes the latter —O—A< group where R' is hydrogen such that the polyetherimide is of the formula:

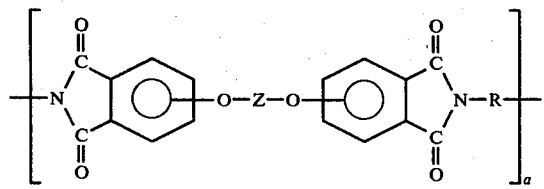

and the divalent bonds of the —O—Z—O radical are in the 3,3'; 3,4'; 4,3' or the 4,4', position; Z is a member of the class consisting of (1)

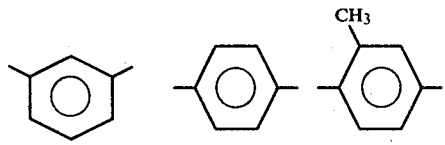

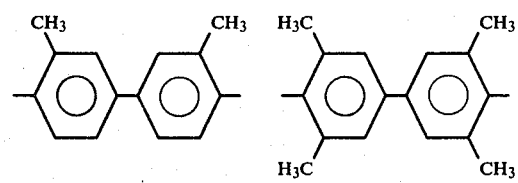

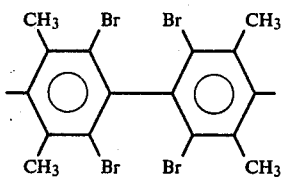

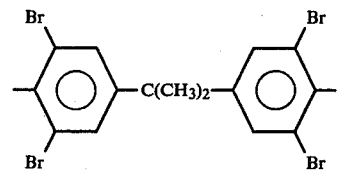

and (2) divalent organic radicals of the general formula:

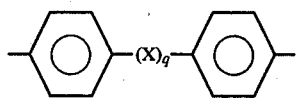

where X is a member selected from the class consisting of divalent radicals of the formulas, $$-C_yH_{2y}-, -\overset{O}{\underset{}{C}}-, -\overset{O}{\underset{O}{S}}-, -O- \text{ and } -S-,$$

where q is 0 or 1, y is a whole number from 1 to 5, and R is a divalent organic radical selected from the class consisting of (1) aromatic hydrocarbon radicals having from 6-20 carbon atoms and halogenated derivatives thereof, (2) alkylene radicals and cycloalkylene radicals having from 2-20 carbon atoms, $C_{(2-8)}$ alkylene terminated polydiorganosiloxane, and (3) divalent radicals included by the formula

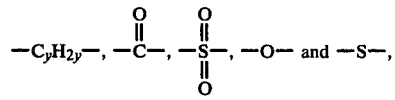

where Q is a member selected from the class consisting $$-O-, -\overset{O}{\underset{}{C}}-, -\overset{O}{\underset{O}{S}}-, -S- \text{ and } -C_xH_{2x}-$$

where x is a whole number from 1 to 5 inclusive. Particularly preferred polyetherimides for the purposes of the present invention include those where —O—A< and Z respectively are:

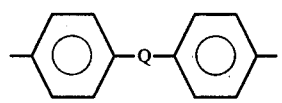

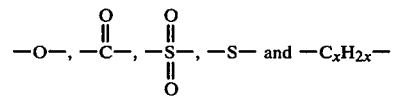

and R is selected from:

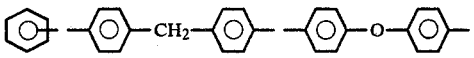

The polyetherimides where R is metaphenylene are most preferred.

The acrylate copolymer utilized in the present invention is a copolymer of a $C_1$–$C_5$ methacrylate and a $C_1$–$C_5$ acrylate, wherein the term $C_1$–$C_5$ represents both saturated and unsaturated, straight or branched chain aliphatic hydrocarbon radicals having from 1 to 5 carbon atoms.

Preferred acrylates for use in the copolymer are methyl acrylate, ethyl acrylate, isobutyl acrylate, 1,4-butanediol diacrylate, n-butyl acrylate, and 1,3-butylene diacrylate. Preferred methacrylates for use in this copolymer include methyl methacrylate, isobutyl methacrylate, 1,3-butylene dimethacrylate, butyl methacrylate and ethyl methacrylate.

The acrylate portion of the copolymer, based on the total weight of the copolymer, can range from about 50 to about 85 weight percent. The methacrylate portion of the copolymer can range from about 15 to about 50 weight percent.

A preferred acrylate copolymer for use in this invention is a copolymer of n-butyl acrylate and methyl methacrylate in which the weight ratio of the n-butyl acrylate fraction of the methyl methacrylate fraction in the copolymer is about 3 to 2.

The polyetherimides can be obtained by any of the methods well known to those skilled in the art including the reaction of any aromatic bis(ether anhydrides) of the formula

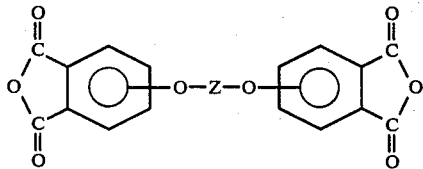

where Z is as defined hereinbefore with an organic diamine of the formula $$H_2N—R—NH_2$$

where R is as defined hereinbefore.

Aromatic bis(ether anhydride)s of the above formula include, for example, 2,2-bis[4-(2,3-dicarboxyphenoxy)phenyl]-propane dianhydride; 4,4'-bis(2,3-dicarboxyphenoxy)diphenyl ether dianhydride; 1,3-bis(2,3-dicarboxyphenoxy)benzene dianhydride; 4,4'-bis(2,3-dicarboxyphenoxy)diphenyl sulfide dianhydride; 1,4-bis(2,3-dicarboxyphenoxy)benzene dianhydride; 4,4'-bis(2,3-dicarboxyphenoxy) benzophenone dianhydride; 4,4'-bis(2,3-dicarboxyphenoxy)diphenyl sulfone dianhydride; 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 1,3-bis(3,4-dicarboxyphenoxy)benzene dianhydride; 1,4-bis(3,4-dicarboxyphenoxy)benzene dianhydride; 4,4'-bis(3,4-dicarboxyphenoxy)benzophenone dianhydride; 4-(2,3-dicarboxyphenoxy)-4-(3,4-dicarboxyphenoxy)diphenyl-2,2-propane dianhydride; etc. and mixtures of such dianhydrides.

In addition, aromatic bis(ether anhydride)s also included by the above formula are shown by Koton, M. M.; Florinski, F. S.; Bessonov, M. I.; Rudakov, A. P. (Institute of Heteroorganic compounds, Academy of Sciences, U.S.S.R.), U.S.S.R. 257,010, Nov. 11, 1969, Appl. May 3, 1967. In addition, dianhydrides are shown by M. M. Koton, F. S. Florinski, Zh Org. Khin, 4(5), 774 (1968).

Organic diamines of the above formula include, for example, m-phenylenediamine, p-phenylenediamine, 4,4'-diaminodiphenylpropane, 4,4'-diaminodiphenylmethane, benzidine, 4,4'-diaminodiphenyl sulfide, 4,4'-diaminodiphenyl sulfone, 4,4'-diaminodiphyenyl ether, 1,5-diaminonaphthalene, 3,3'-dimenthylbenzidine, 3,3'-dimethoxybenzidine, 2,4-bis(β-amino-t-butyl)toluene, bis(p-β-amino-t-butylphenyl)ether, bis(p-β-methyl-o-aminopentyl)benzene, 1,3-diamino-4-isopropylbenzene, 1,2-bis(3-aminopropoxy)ethane, m-xylylenediamine, p-xylylenediamine, 2,4-diaminotoluene, 2,6-diaminotoluene, bis(4-aminocyclohexyl)methane, 3-methylheptamethylenediamine, 4,4-dimethylheptamethylenediamine, 2,11-dodecanediamine, 2,2-dimethylopropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecanediamine, bis(3-aminopropyl)sulfide, N-methyl-bis(3-aminopropyl)amine, hexamethylenediame, heptamethylenediamine, nonamethylenediamine, decamethylenediamine, bis(3-aminopropyl) tetramethyldisiloxane, bis(4-aminobutyl) tetramethyldisiloxane, etc.

In general, the reactions can be advantageously carried out employing well-known solvents, e.g., o-dichlorobenzene, m-cresol/toluene, etc. in which to effect interaction between the dianhydrides and the diamines, at temperatures of from about 100° to about 240° C. Alternatively, the polyetherimides can be prepared by melt polymerization of any of the above dianhydrides with any of the above diamino compounds while heating the mixture of the ingredients at elevated temperatures with concurrent intermixing. Generally, melt polymerization temperatures between about 200° to 400° C. and preferably 230° to 300° C. can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides having terminal amine groups. Generally, useful polyetherimides have an intrinsic viscosity [η] greater than 0.2 deciliters per gram, preferably 0.35 to 0.60, or 0.7 deciliters per gram or even higher when measured in m-cresol at 25° C.

Included among the many methods of making the polyetherimides are those disclosed in U.S. Pat. Nos. Heath et al, 3,847,867, Williams 3,847,869, Takekoshi et al. 3,850,885, White 3,852,242 and 3,855,178, etc. These disclosures are incorporated herein in their entirety by reference for the purpose of teaching, by way of illustration, general and specific methods for preparing polyetherimides suitable for the blends of this invention.

Suitable acrylate copolymers, as defined previously, can be prepared by methods well known to those skilled in the art or can be obtained commercially. For example, methods for forming acrylate copolymers are discussed in the Kirk-Othmer Encyclopedia of Chemical Technology, Vol. 1, pp. 303–310, John Wiley & Sons (1963). Commercially available acrylate copolymers suitable for the blends of the present invention include those copolymers sold under the tradenames Durastrength 200 by M.T. Chemicals Inc. and Acrylocid ® KM-330 by Rohm & Haas Co., Philadelphia Pa., the latter being a copolymer of n-butyl acrylate and methyl methacrylate.

In accordance with the present invention, useful blends of a polyetherimide and a acrylate copolymer are generally obtainable when the blends contain a minor proportion of acrylate copolymer. Such blends have a higher impact strength than that associated with the polyetherimide component of the blend. Consequently, blends comprising from about 70 to about 99% by weight, polyetherimide and from about 30 to about 1% by weight, acrylate copolymer preferably from about 80 to 99% polyetherimide and from about 1 to about 20 wt. % acrylate copolymer, are included within the scope of the invention.

In general, blends of polyetherimides and acrylate copolymers can be tailored to provide desired physical characteristics by selecting appropriate proportion of blend components. Higher proportions of polyetherimide usually contribute higher mechanical properties and higher heat deflection temperatures for the blend. Higher proportions of acrylate copolymers generally provide higher impact strength for the blend. A good appearing blend is generally achieved regardless of the relative proportions of the blend components.

It is contemplated that the polyetherimide-acrylate copolymer blends of the present invention may also include additive materials such as fillers, stabilizers, plasticizers, flexibilizers, surfactant agents, pigments, dyes, reinforcements, flame retardants and diluents in conventional amounts. It is also contemplated that the blends of the invention may include two or more polyetherimides with one or more acrylate copolymers or two or more acrylate copolymers in combination with one or more polyetherimides.

Methods for forming polyetherimide-acrylate copolymer blends may vary considerably. Prior art blending techniques are generally satisfactory. A preferred method comprises blending the polymers and additives such as reinforcements in powder, granular or filamentous form, extruding the blend, and chopping the extrudate into pellets suitable for molding by means conventionally used to mold normally solid thermoplastic compositions.

The polyetherimide-acrylate copolymer blends of the present invention have application in a wide variety of physical shapes and forms, including the use as films, molding compounds, coatings, etc. When used as films or when made into molded products, these blends, including laminated products prepared therefrom, not only possess good physical properties at room temperature but they retain their strength and excellent response to workloading at elevated temperatures for long periods of time. Films formed from the blends of this invention may be used in application where films have been used previously. Thus, the blends of the present invention can be used in automobile and aviation applications for decorative and protective purposes, and at high temperature electrical insulation for motor slot liners, transformers, dielectric capacitors, coil and cable wrappings (form wound coil insulation for motors), and for containers and container linings. The blends can also be used in laminated structures where films or solutions of the blend are applied to various heat-resistant or other type of materials such as asbestos, mica, glass fiber and the like, the sheets superimposed one upon the other, and thereafter subjecting the sheets to elevated temperatures and pressures to effect flow and cure of the resinous binder to yield cohesive laminated structures. Films made from the subject polyetherimide-acrylate copolymer blends can also serve in printed circuit applications.

Alternatively, solutions of the blends herein described can be coated on electrical conductors such as copper, aluminum, etc. and thereafter the coated conductor can be heated at elevated temperatures to remove the solvent and provide a continuous resinous composition thereon. If desired, an additional overcoat may be applied to such insulated conductors including the use of polymeric coatings, such as polyamides, polyesters, silicones, polyvinylformal resins, epoxy resins, polyimides, polytetrafluoroethylene, etc. The use of the blends of the present invention as overcoats on other types of insulation is not precluded.

Other applications which are contemplated for these blends include their use as binders for asbestos fibers, carbon fibers, and other fibrous materials in making brake linings. In addition, molding compositions and molded articles may be formed from the polymeric blends of the invention by incorporating such fillers as asbestos, glass fibers, talc, quartz, powder, finely divided carbon, silica, and the like into the blends prior to molding. Shaped articles may be formed under heat, or under heat and pressure, in accordance with practices well-known in the art.

The following examples illustrate specific polyetherimide-acrylate copolymer blends in accordance with the present invention. It should be understood that the examples are given for the purpose of illustration and do not limit the invention. In the examples, all parts and percentages are by weight unless otherwise specified.

EXAMPLE I

A polyetherimide-acrylate copolymer blend according to the invention was prepared, molded into test specimens and the specimens tested for various physical properties.

The polyetherimide was prepared from the reaction product of essentially equimolar amounts of 2,2-bis[4-(3,4-dicarboxyphenoxy) phenyl] propane dianhydride and m-phenylene diamine produced at elevated temperature of about 250° to about 300° C. and under a nitrogen atmosphere. The polymer was extruded at about 300° C. to form a strand and mechanically chopped into pellets. A test specimen of the polyetherimide was injection molded from the pellets at a temperature of about 685°–700° F.

The acrylate copolymer used in forming the blend was a copolymer sold commercially under the trade name Acryloid KM-330 by Rohm & Haas Co. which is the copolymer of n-butyl acrylate and methyl methacrylate. The blend was prepared by mixing the two polymers in a proportion of about 95 parts polyetherimide and about 5 parts acrylate copolymer and then extruding the mixture in a Werner & Pfleiderer extruder having a temperature profile varying from about 590° to 625° F. and a die temperature of about 590° F. The resulting extrudate was comminuted into pellets and the pellets injection molded at about 321° C. into test specimens. Impact strengths of this specimen as well as of the specimen of the polyetherimide were measured according to the notched Izod impact test, ASTM D256, and the results are set forth in the Table. The heat deflection temperature, flexural properties and tensile properties of the specimens were also determined and are given in the Table both for the polyetherimide and for the blend.

TABLE

| Example | Proportion Acrylate Copolymer (%) | Notched Izod Impact 3.2mm bar (ft lbs/in) | Heat Deflection Temperature (°C. @ 1.82 MPa) | Flexural Properties | | | Tensile Properties | | | |
|---|---|---|---|---|---|---|---|---|---|---|
| | | | | Initial Modulus (psi × $10^5$) | Strength @ 6.2mm Defl. (psi × $10^4$) | Ultimate Strength (psi × $10^4$) | Yield | | Failure | |
| | | | | | | | (%) | (psi × $10^4$) | (%) | (psi × $10^4$) |
| | 0 | 0.6 | 192 | 4.80 | 1.94 | 2.38 | 13 | 1.53 | 30 | 1.22 |
| I | 5 | 0.9 | 169 | 4.70 | 1.90 | 2.28 | 16 | 1.32 | 19 | 1.27 |
| II | 10 | 1.7 | 168 | 3.49 | 1.31 | 1.62 | | | | |
| III | 15 | 1.9 | 173 | 4.63 | 1.84 | 2.16 | 14 | 1.42 | 27 | 1.16 |
| IV | 5 | 1.1 | 177 | 4.66 | 1.88 | 2.25 | 11 | 1.43 | 14 | 1.43 |
| V | 10 | 1.7 | 171 | — | — | — | — | — | 8 | 0.82 |
| VI | 15 | 1.8 | 170 | 3.15 | 1.11 | 1.31 | — | — | 11 | 0.60 |

EXAMPLE II

The procedure of Example I was repeated with the exception that about 90 parts of polyetherimide were mixed with about 10 parts of acrylate copolymer to produce the blend according to the invention. The results of the notched Izod impact test, as well as the heat deflection temperature, flexural properties and tensile properties for test specimens of the blend are detailed in the Table.

EXAMPLE III

The procedure of Example I was repeated with the exception that about 85 parts of polyetherimide were blended with about 15 parts of acrylate copolymer to produce the blend according to the invention. The results of the notched Izod impact test, as well as the heat deflection temperature, flexural properties and tensile properties for test specimens of the blend are detailed in the Table.

EXAMPLE IV

The procedure of Example I was repeated with the exception that the acrylate copolymer used to produce the blend was copolymer sold under the tradename Durastrength 200 by M. & T. Chemicals Inc. The results of the notched Izod impact test, as well as the heat deflection temperature, flexural properties and tensile properties for test specimens of the blend are detailed in the Table.

EXAMPLE V

The procedure of Example IV was repeated with the exception that about 90 parts of polyetherimide were blended with about 10 parts of acrylate copolymer to produce the blend according to the invention. The results of the notched Izod impact test, as well as the best deflection temperature, flexural properties and tensile properties for test specimens of the blend are detailed in the Table.

EXAMPLE VI

The procedure of Example IV was repeated with the exception that about 85 parts of polyetherimide were blended with about 15 parts of acrylate copolymer to produce the blend according to the invention. The results of the notched Izod impact test, as well as the heat deflection temperature, flexural properties and tensile properties for test specimens of the blend are detailed in the Table.

As is apparent from the above test results, blends according to the present invention have an improved impact strength over the polyetherimide component by itself. More specifically, the notched Izod impact strength of the blends is improved over that of the polyetherimide by up to a factor of three, e.g., the blend of Example III, while the flexural and tensile properties of the blend are comparable to that of the polyetherimide component alone and the heat deflection temperature is only slightly below that of the polyetherimide. In addition, it was note that the blends have improved molding characteristics over the polyetherimide component of the blends, probably due to the acrylate copolymer functioning as a lubricant.

Substitution of other polyetherimides and/or other acrylate copolymers for the polyetherimide and/or acrylate copolymer of the blends of the above examples can result in the formulation of polyetherimide-acrylate copolymer blends having similar characteristics such as improved impact strength and such blends are considered within the scope of the invention.

While the present invention has been described with reference to particular embodiments thereof, it will be understood that numerous modifications may be made by those skilled in the art without actually departing from the spirit and scope of the invention as deined in the appended claims.

We claim:

1. A composition comprising a blend of (a) a minor proportion of an acrylate copolymer and (b) a polyetherimide.

2. A composition in accordance with claim 1 wherein the acrylate copolymer is a copolymer of a $C_1$–$C_5$ methacrylate and a $C_1$–$C_5$ acrylate, $C_1$–$C_5$ representing aliphatic hydrocarbon radicals having from 1 to 5 carbon atoms.

3. A composition in accordance with claim 2 wherein the $C_1$–$C_5$ methacrylate is selected from methyl methacrylate, isobutyl methacrylate, 1,3-butylene dimethyacrylate, butyl methacrylate and ethyl methacrylate, and the $C_1$–$C_5$ acrylate is selected from methyl acrylate, ethyl acrylate, isobutyl acrylate, 1,4-butanediol diacrylate, n-butyl acrylate, and 1,3-butylene diacrylate.

4. A composition in accordance with claim 3 wherein the acrylate portion of the copolymer is from 50 to about 85% based on the total weight of the copolymer.

5. A composition in accordance with claim 4 wherein the copolymer is of n-butyl acrylate and methyl methacrylate.

6. A composition in accordance with claims 1, 2, 3, 4 or 5 wherein the polyetherimide has the formula:

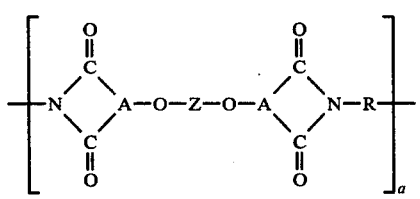

where a represents a whole number in excess of 1, the group —O—A< is selected from:

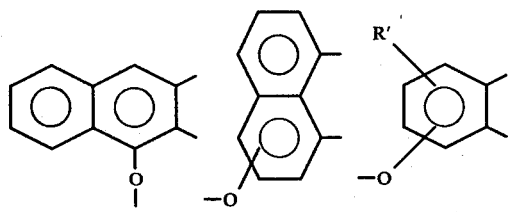

R' being hydrogen, lower alkyl or lower alkoxy, Z is a member of the class consisting of (1)

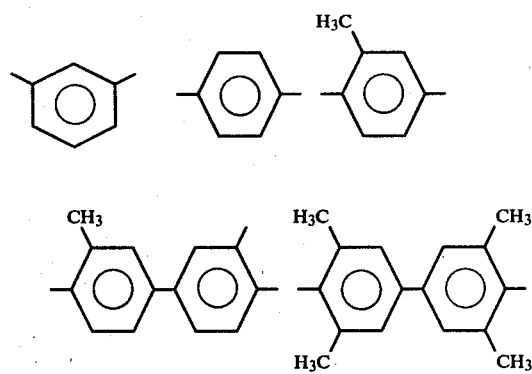

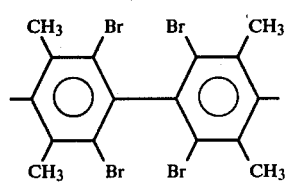

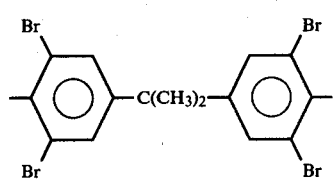

and (2) divalent organic radicals of the general formula:

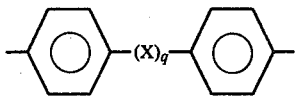

where X is a member selected from the class consisting of divalent radicals of the formulas,

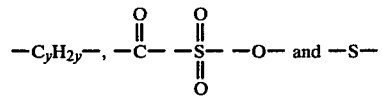

where q is 0 or 1, y is a whole number from 1 to 4, and R is a divalent organic radical selected from the class consisting of (1) aromatic hydrocarbon radicals having from 6-20 carbon atoms and halogenated derivatives thereof, (2) alkylene radicals and cycloalkylene radicals having from 2-20 carbon atoms, $C_{(2-8)}$ alkylene terminated polydiorganosiloxane, and (3) divalent radicals included by the formula

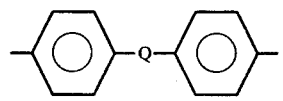

where Q is a member selected from the class consisting of

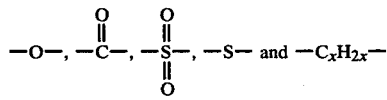

where x is a whole number from 1 to 5 inclusive.

7. A composition in accordance with claim 6 wherein the polyetherimide is of the formula;

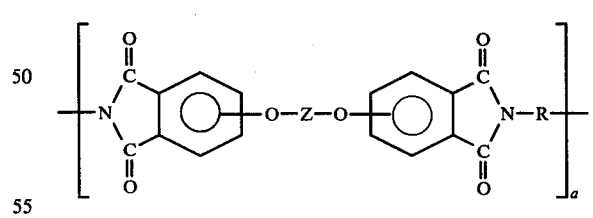

and the divalent bonds of —O—Z—O-radical are in the 3,3'; 3,4'; 4,3' or the 4,4' position.

8. A composition in accordance with claim 7 wherein Z is;

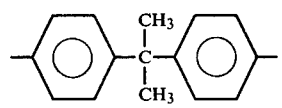

and R is selected from;
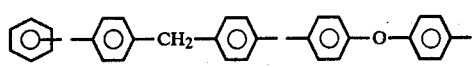
9. A composition in accordance with claim 8 wherein the polyetherimide is of the formula:
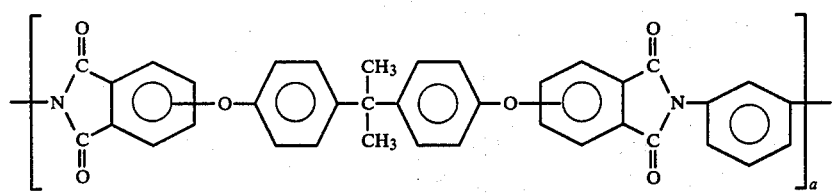
* * * * *

UNITED STATES PATENT AND TRADEMARK OFFICE
CERTIFICATE OF CORRECTION

PATENT NO. : 4,395,518
DATED : July 26, 1983
INVENTOR(S) : Harold F. Giles, Jr. and Dwain M. White It is certified that error appears in the above—identified patent and that said Letters Patent is hereby corrected as shown below:

Column 3, lines 3 and 4,

""

should be:

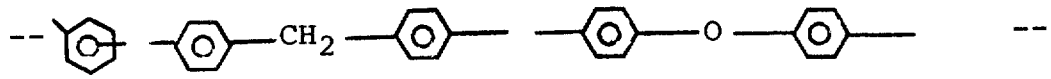

Column 7, line 57, "best" should be --heat--.

Column 8, line 43, "deined" should be --defined--.

Column 11, lines 3 and 4,

"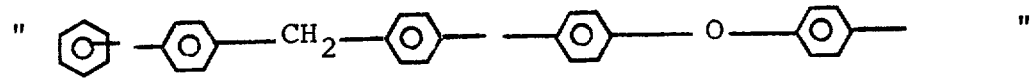"

should be:

UNITED STATES PATENT AND TRADEMARK OFFICE
CERTIFICATE OF CORRECTION

Page 2 of 2

PATENT NO. : 4,395,518
DATED : July 26, 1983
INVENTOR(S) : Harold F. Giles and Dwain M. White It is certified that error appears in the above—identified patent and that said Letters Patent are hereby corrected as shown below:

Signed and Sealed this

Seventh Day of February 1984

[SEAL]

Attest:

GERALD J. MOSSINGHOFF

Attesting Officer

Commissioner of Patents and Trademarks